United States Patent
Yoshida et al.

(10) Patent No.: US 10,142,689 B2
(45) Date of Patent: Nov. 27, 2018

(54) SERVER, TERMINAL, INFORMATION PROCESSING METHOD, INFORMATION PROCESSING PROGRAM, AND COMPUTER-READABLE RECORDING MEDIUM STORING INFORMATION PROCESSING PROGRAMS

(71) Applicant: Sony Computer Entertainment Inc., Tokyo (JP)

(72) Inventors: Kazushi Yoshida, Tokyo (JP); Hideaki Watanabe, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 1143 days.

(21) Appl. No.: 14/370,091

(22) PCT Filed: Oct. 10, 2012

(86) PCT No.: PCT/JP2012/076205
§ 371 (c)(1),
(2) Date: Jul. 1, 2014

(87) PCT Pub. No.: WO2013/108446
PCT Pub. Date: Jul. 25, 2013

(65) Prior Publication Data
US 2015/0031453 A1 Jan. 29, 2015

(30) Foreign Application Priority Data
Jan. 17, 2012 (JP) .................................. 2012-006829

(51) Int. Cl.
*G06F 15/16* (2006.01)
*H04N 21/442* (2011.01)
(Continued)

(52) U.S. Cl.
CPC ...... *H04N 21/44231* (2013.01); *A63F 13/358* (2014.09); *A63F 13/44* (2014.09); *H04L 67/38* (2013.01)

(58) Field of Classification Search
CPC .. H04N 21/44231; A63F 13/358; H04L 67/38
See application file for complete search history.

(56) References Cited

U.S. PATENT DOCUMENTS 8,488,534 B2   7/2013  Miki
9,523,767 B2 * 12/2016  Rofougaran .......... G01S 13/426
(Continued)

FOREIGN PATENT DOCUMENTS

CN   101449466 A   6/2009
CN   101682492 A   3/2010
(Continued)

OTHER PUBLICATIONS

Office Action for corresponding CN Application No. 201280066693.3, dated Nov. 19, 2015.
(Continued)

*Primary Examiner* — Joseph E Avellino
*Assistant Examiner* — Rachel J Hackenberg
(74) *Attorney, Agent, or Firm* — Matthew B. Dernier, Esq.

(57) ABSTRACT

A delay is suppressed that occurs in a period of time from the actual inputting of operation information into a terminal by a user to the forming of image information corresponding to this operation information in a server and the displaying of this image information on the terminal. Provided is a server having: operation information acquisition means configured to sequentially acquire each piece of operation information sequentially transmitted from a terminal through a network; execution means configured to execute an application by executing processing corresponding to the each piece of (Continued)

operation information in accordance with a timing with which the operation information acquisition means acquired the each piece of operation information; execution control means configured, if a first predetermined interval has passed from a moment when the execution means started processing corresponding to first operation information of the each piece of operation information without acquiring second operation information acquired after the first input information, to make the execution means execute processing in accordance with the first input information again; and transmission means configured to transmit image information based on the execution of the application by the execution block to the terminal.

13 Claims, 7 Drawing Sheets

(51) Int. Cl.
*A63F 13/358* (2014.01)
*A63F 13/44* (2014.01)
*H04L 29/06* (2006.01)

(56) References Cited

U.S. PATENT DOCUMENTS

| | | | |
|---|---|---|---|
| 2006/0046811 A1 | 3/2006 | Kogo | |
| 2008/0096667 A1* | 4/2008 | Konuma | A63F 13/12 463/42 |
| 2009/0037526 A1* | 2/2009 | Elliott | A63F 13/12 709/203 |
| 2009/0132893 A1 | 5/2009 | Miyazaki | |
| 2010/0067465 A1 | 3/2010 | Miki | |
| 2011/0183765 A1* | 7/2011 | Kobayashi | A63F 13/428 463/43 |

FOREIGN PATENT DOCUMENTS

| | | |
|---|---|---|
| JP | 11-324436 A | 11/1999 |
| JP | 2002278869 A | 9/2002 |
| JP | 2006068144 A | 3/2006 |
| JP | 2010142527 A | 7/2010 |
| WO | 2006057185 A1 | 6/2006 |

OTHER PUBLICATIONS

Feng Deng, Typical Module Development Index of 51 SCM Application System, pp. 1-20, (Jul. 31, 2011) (for relevancy see p. 5 #7 of Office Action for corresponding CN Application No. 201280066693.3, dated Nov. 19, 2015).

Chen Li, Practice of Ipad Application and Development pp. 151-155, (May 31, 2011) (for relevancy see p. 6 #10 of Office Action for corresponding CN Application No. 201280066693.3, dated Nov. 19, 2015).

Liquin Luo, Windows Network Programming, pp. 266-272, (Apr. 30, 2011) (for relevancy see p. 6 #9 of Office Action for corresponding CN Application No. 201280066693.3, dated Nov. 19, 2015).

Office Action for corresponding JP Application No. 2013-554181, dated May 12, 2015.

International Preliminary Report on Patentability and Written Opinion or corresponding PCT Application No. PCT/JP2012/076205, dated Jul. 31, 2014.

International Search Report for corresponding PCT Application No. PCT/JP2012/076205, dated Dec. 11, 2012.

* cited by examiner

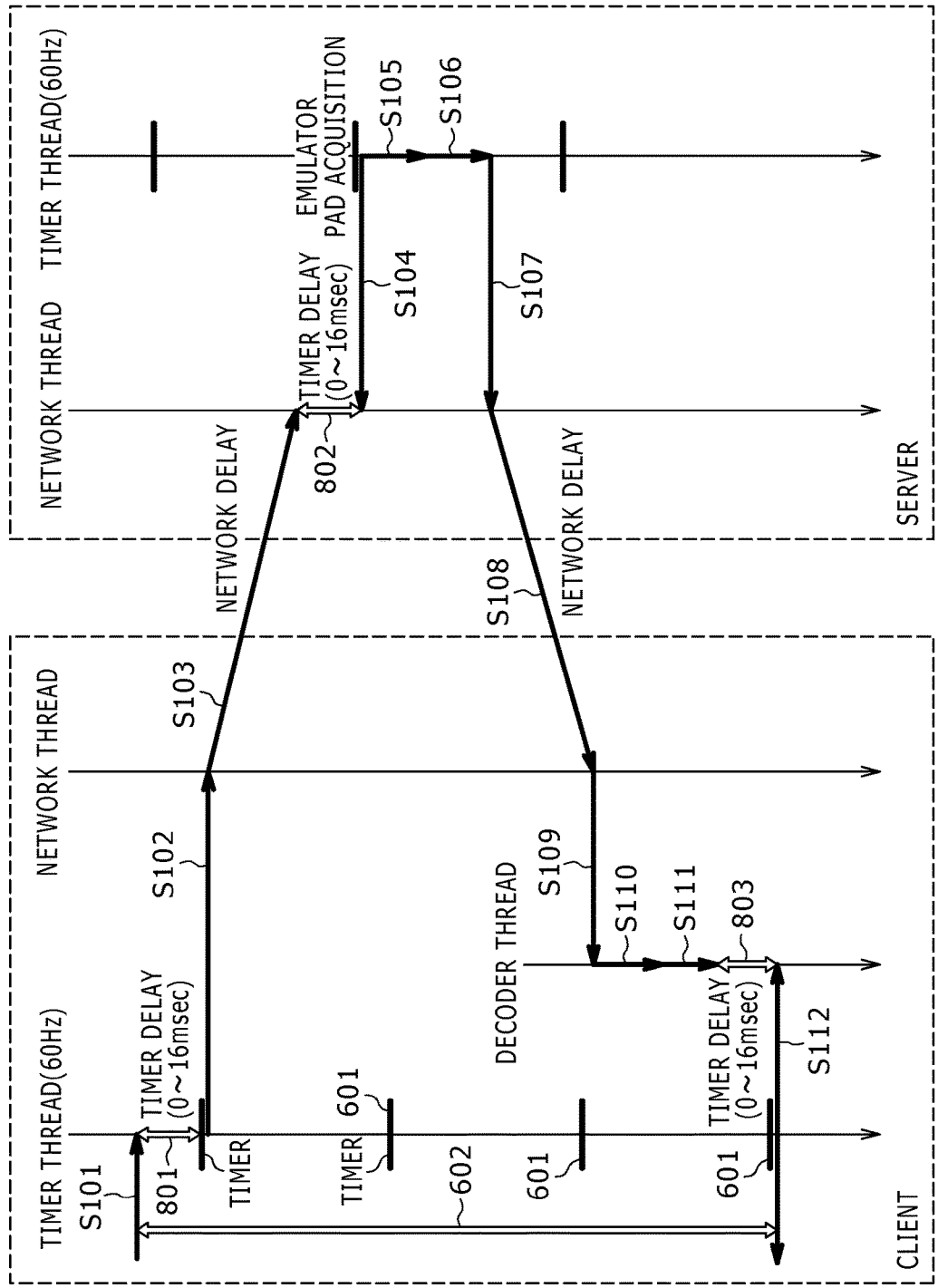

SERVER, TERMINAL, INFORMATION PROCESSING METHOD, INFORMATION PROCESSING PROGRAM, AND COMPUTER-READABLE RECORDING MEDIUM STORING INFORMATION PROCESSING PROGRAMS

TECHNICAL FIELD

The present invention relates to a server, a terminal, an information processing method, an information processing program, and a computer-readable recording medium storing information processing programs.

BACKGROUND ART

Online games are known in which a server receives operation information from a terminal and transmits results of the processing executed on the basis of the received operation information to the terminal that executes screen display and other processing in accordance with the received processing results. In these online games, every time a server gets operation information from a client through a network, the server generates image information based on the received operation information and transmits the generated image information to the terminal through the network, for example. Then, the terminal displays the image information acquired from the server through the network on a display section.

SUMMARY

Technical Problems

In a dedicated game machine, an input (operation information) into a pad of a controller is acquired in accordance with a timing (a timing based on a vertical synchronization signal for example) of every predetermined interval provided by a timer. In addition, the execution of a game program in accordance with this operation information or the drawing of an image based on this execution is also performed in accordance with this timing.

It is considered here that a game designed to be executed on a dedicated game machine as described above is executed by an emulator or simulator of this dedicated game machine provided on a server so as to distribute this game in a so-called stream-distribution manner. In this case, if the emulator or the simulator is configured to acquire operation information in accordance with a predetermined timing as with the above-mentioned dedicated game machine, a delay is caused by the acquisition and transmission of operation information at a terminal, the input of this operation information into the emulator or the like, or the acquisition and display of image information generated by the emulator, in addition to a delay caused by networking. As a result, a response characteristic from the actual inputting of the operation information by a user to the reflection of this operation information onto a play image is deteriorated.

In order to circumvent the problems described above, it is considered that the acquisition of operation information and the execution of a game program in accordance with this operation information by an emulator or a simulator is done in accordance with a timing with which a server acquires the operation information. In this case, however, the operation information sequentially acquired at a terminal is transmitted to the server via a network, so that, depending on communication conditions of the network, the time interval of each piece of operation information sequentially received by the server is not constant. It is also possible that some of the pieces of operation information sequentially transmitted be lost. If this happens, the constancy of display intervals of images corresponding to the pieces of operation information is lost, thereby causing problems such as making unnatural the displaying of game images or losing the smoothness of game playing, for example.

Addressing the above-mentioned problems, it is an objective of the present invention to realize a server, a terminal, an information processing method, an information processing program, and a computer-readable recording medium storing information processing programs that suppress the delays to be caused in a period of time from the actual inputting of operation information by a user into the terminal to the forming of image information on the server based on the inputted operation information and the displaying of the formed image information onto the terminal and enable the updating of screens more smoothly than before.

Solution to Problems (1) A server in the present invention includes: operation information acquisition means configured to sequentially acquire each piece of operation information sequentially transmitted from a terminal through a network; execution means configured to execute an application by executing processing corresponding to the each piece of operation information in accordance with a timing with which the operation information acquisition means acquired the each piece of operation information; execution control means configured, if a first predetermined interval has passed from a moment when the execution means started processing corresponding to first operation information of the each piece of operation information without acquiring second operation information acquired after the first input information, to make the execution means execute processing in accordance with the first input information again; and transmission means configured to transmit image information based on the execution of the application by the execution block to the terminal.

(2) In the server cited in (1) above, if the second operation information has been acquired within a second predetermined interval shorter than the first predetermined interval after starting processing corresponding to the first operation information of the each piece of input information, then the execution control means skips execution by the execution means to be done in accordance with the second operation information.

(3) In the server cited in (1) or (2) above, each piece of operation information sequentially transmitted from the terminal is sequentially detected by the terminal with every predetermined timing generated by a timer and sequentially transmitted to the server through the network.

(4) In the server cited in (1) or (2) above, each piece of operation information sequentially transmitted from the terminal is transmitted to the server through the network with a timing corresponding to detection of the each piece of operation information at the terminal.

(5) In the server cited in (2) above, the execution control means restricts the number of times the each piece of operation information is processed in the execution block within a third predetermined interval different from the first and second predetermined intervals.

(6) A terminal in the present invention includes: operation information acquisition means configured to acquire each piece of operation information sequentially entered in an operator block; operation information transmission means configured to sequentially transmit operation information sequentially acquired by the operation information acquisition means to a server through a network; image information reception means configured to receive each piece of image information transmitted from transmission means of the server, the server having operation information acquisition means configured to sequentially acquire each piece of operation information sequentially transmitted from the operation information transmission means, execution means configured to execute an application by executing processing corresponding to the each piece of operation information in accordance with a timing with which the operation information acquisition means acquired the each piece of operation information, execution control means configured, if a first predetermined interval has passed from a moment when the execution means started processing corresponding to first operation information of the each piece of operation information without acquiring second operation information acquired after the first input information, to make the execution means execute processing in accordance with the first input information again, and the transmission means configured to transmit image information based on the execution of the application by the execution block to the terminal; and display means configured to display each piece of image information received by the image information reception means.

(7) In the terminal cited in (6) above, the operation information acquisition means detects and acquires operation information entered in the operator block in accordance with every predetermined timing generated by a timer.

(8) In the terminal cited in (6) above, the operation information acquisition means detects and acquires the each piece of operation information entered in the operator block in accordance with a timing with which the each piece of operation information was entered in the operator block.

(9) In the terminal cited in (8) above, the operation information acquisition means detects and acquires the each piece of operation information entered in the operator block by detecting an edge of the each piece of operation information.

(10) In the terminal cited in (7) above, the display means displays each piece of image information received by the image information reception means in every interval generated by the timer.

(11) In the terminal cited in (8) or (9) above, the display means displays the each piece of image information in accordance with a timing with which the each piece of image information was received by the image information reception means.

(12) An information processing method in the present invention includes: sequentially acquiring each piece of operation information sequentially transmitted from a terminal through a network; executing, by execution means, an application by executing processing corresponding to the each piece of operation information in accordance with a timing with which the each piece of operation information was acquired; making, if a first predetermined interval has passed from a moment when the execution means started processing corresponding to first operation information of the each piece of operation information without acquiring second operation information acquired after the first input information, the execution means execute processing in accordance with the first input information again; and transmitting image information based on the execution of the application by the execution block to the terminal.

(13) An information processing program in the present invention causes a computer to function as: operation information acquisition means configured to sequentially acquire each piece of operation information sequentially transmitted from a terminal through a network; execution means configured to execute an application by executing processing corresponding to the each piece of operation information in accordance with a timing with which the operation information acquisition means acquired the each piece of operation information; execution control means configured, if a first predetermined interval has passed from a moment when the execution means started processing corresponding to first operation information of the each piece of operation information without acquiring second operation information acquired after the first input information, to make the execution means execute processing in accordance with the first input information again; and transmission means configured to transmit image information based on the execution of the application by the execution block to the terminal.

(14) A computer-readable recording medium in the present invention stores the information processing program cited (13) above.

BRIEF DESCRIPTION OF DRAWINGS

FIG. 9 is a diagram illustrating an example in which a timer-driven processing is executed on the basis of the acquisition of operation information at a terminal and the execution of a program according to operation information at a server.

DESCRIPTION OF EMBODIMENTS

Figure 1:
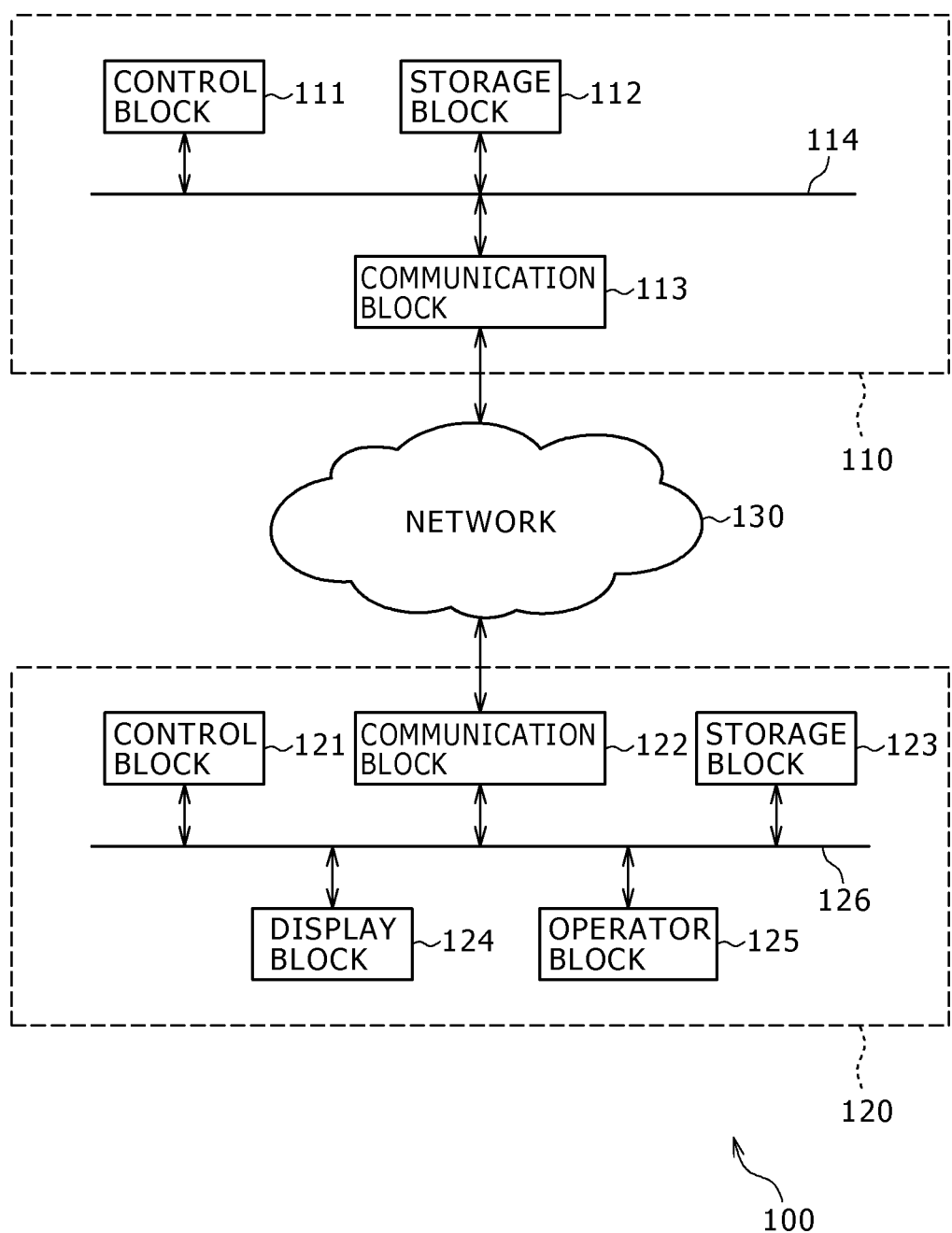
FIG. 1 is a diagram illustrating an overview of a hardware configuration of an information processing system practiced as a first embodiment of the present invention.

The following describes first and second embodiments of the present invention with reference to the drawings. It should be noted that, in the drawings, the same or similar elements are allocated with the same reference signs, any duplicate description being skipped.

[First Embodiment]

Referring to FIG. 1, there is shown an overview of a hardware configuration of an information processing system practiced as the first embodiment of the present invention. As shown in FIG. 1, an information processing system 100 has a server 110 and a terminal 120 connected through a network 130 (the Internet for example). It should be noted that, as shown in FIG. 1, the information processing system 100 have only one terminal 120 but may have two or more terminals 120.

The server 110 includes a control block 111, a storage block 112, and a communication block 113. The control block 111 is a CPU or an MPU for example and operates in accordance with a program stored in the storage block 112. The storage block 112 is made up of an information recording medium such as a hard disk, a ROM, or a RAM, and holds programs that are executed by the control block 111. In addition, the storage block 112 operates also as a work memory for the control block 111. The communication block 113 is a network interface and transmits and receives information through the network 130 as instructed by the control block 111. It should be noted that the control block 111, the storage block 112, and the communication block 113 are interconnected through a bus 114.

The terminal 120 includes a control block 121, a communication block 122, a storage block 123, a display block 124, and an operator block 125. The blocks 121 through 125 are interconnected through a bus 126 like above. Like the server 110 described above, the control block 121 is a CPU or an MPU for example and operates in accordance with a program stored in the storage block 112. The storage block 123 is made up of an information recording medium such as a hard disk, a ROM, or a RAM, and holds programs that are executed by the control block 121. In addition, the storage block 123 operates also as a work memory for the control block 121.

The operator block 125 is made up of an interface such as a keyboard, a mouse, a controller, and buttons, and, according to a user instructive operation, outputs the contents of this instructive operation to the control block 121. The display block 124 is a liquid crystal display, a CRT display, or an organic EL display, for example, and displays information as instructed by the control block 121. It should be noted that programs to be processed by the control block 111 and the control block 121 described above may be provided as downloaded through a network or provided in a variety of computer-readable information recording media such as CD-ROM and DVD-ROM. It should be noted that the configurations of the server 110 and the terminal 120 described above are illustrative only and therefore not restrictive. Functional configurations of the server 110 and the terminal 120 will be detailed later.

Figure 2:
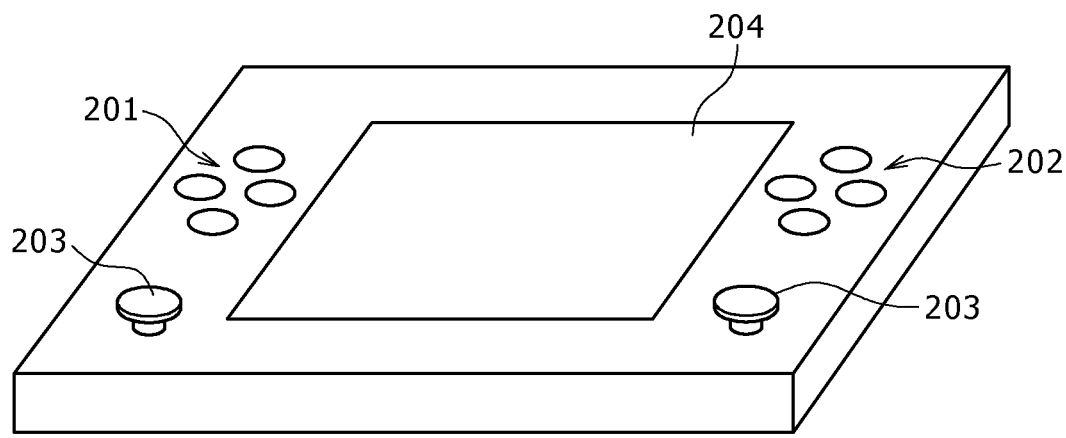
FIG. 2 is a diagram illustrating one example of an external view of a terminal in the first embodiment.

Referring to FIG. 2, there is shown one example of an external view of a terminal. As shown in FIG. 2, the terminal 120 has direction keys 201, two or more buttons 202, and an analog operator part 203 as the operator block 125 and a display screen 204 as the display block 124.

The direction keys 201 include an up key, a down key, a right key, and a left key, for example. Pressing the direction keys 201, the user vertically and horizontally moves an object displayed on the screen. The two or more buttons 202 are arranged at predetermined positions, allowing the user to press these buttons 202 to execute processing according to each button 202 defined by an application to be executed. It should be noted that these buttons 202 may be so-called analog buttons that allow the detection of input signals in proportion to the quantity in which the buttons 202 are pressed.

The analog operator part 203 may be operated in a tilt manner from a predetermined reference position, for example, allowing the user to enter input information corresponding to a tilt quantity and a tilt direction from the reference position of this analog operator part 203. For example, using the analog operator part 203, the user is able to tilt an object displayed on the screen in a desired direction and a desired quantity in accordance with the tilt quantity and the tilt direction. The display screen 204 is equivalent to the display screen of the display block 124 and displays images and the like corresponding to an application, for example.

It should be noted that the external view of the terminal 120 and the configurations of the operator block 125 and display block 124 shown in FIG. 2 are illustrative only and therefore not restrictive. For example, the operator block 125 and the display block 124 may be formed with a touch panel. The display block 124 may be a display screen of a monitor or the like formed with a CRT or a liquid crystal display device. Further, the number of direction keys 201, buttons 202, analog operator part 203 may be other than that mentioned above. The terminal 120 may have other buttons such as a start button or a select button (not shown) and an acceleration sensor or the like.

Figure 3:
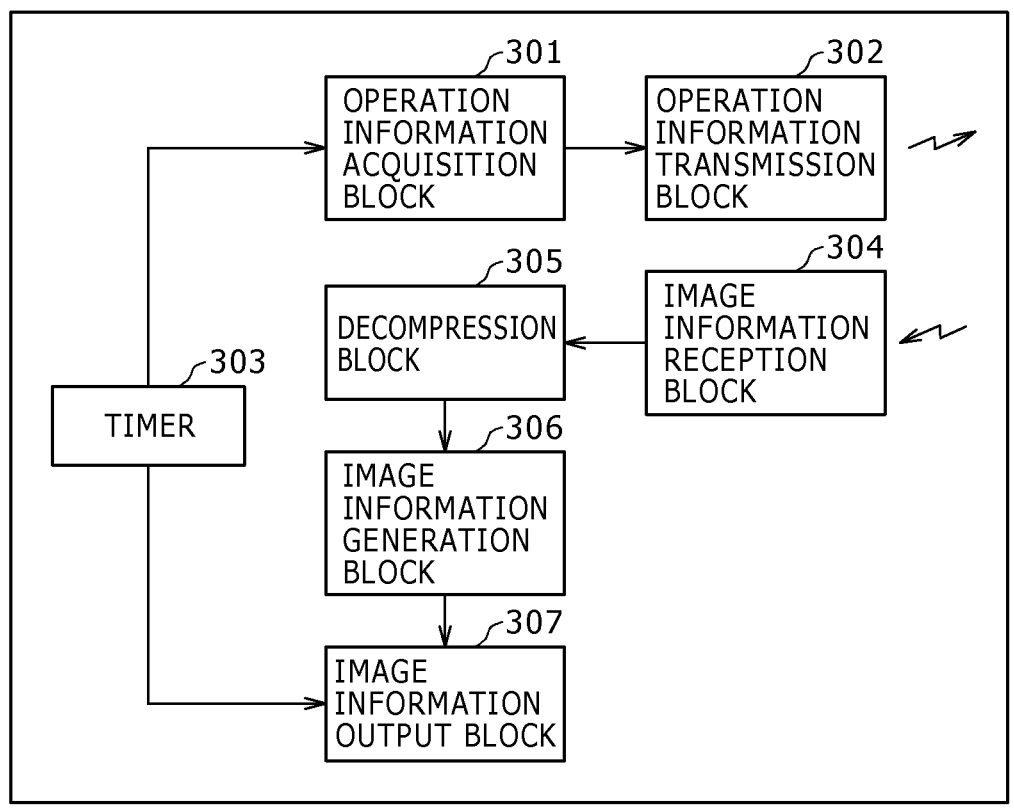
FIG. 3 is a diagram functionally illustrating a configuration of the terminal in the first embodiment.
Figure 4:
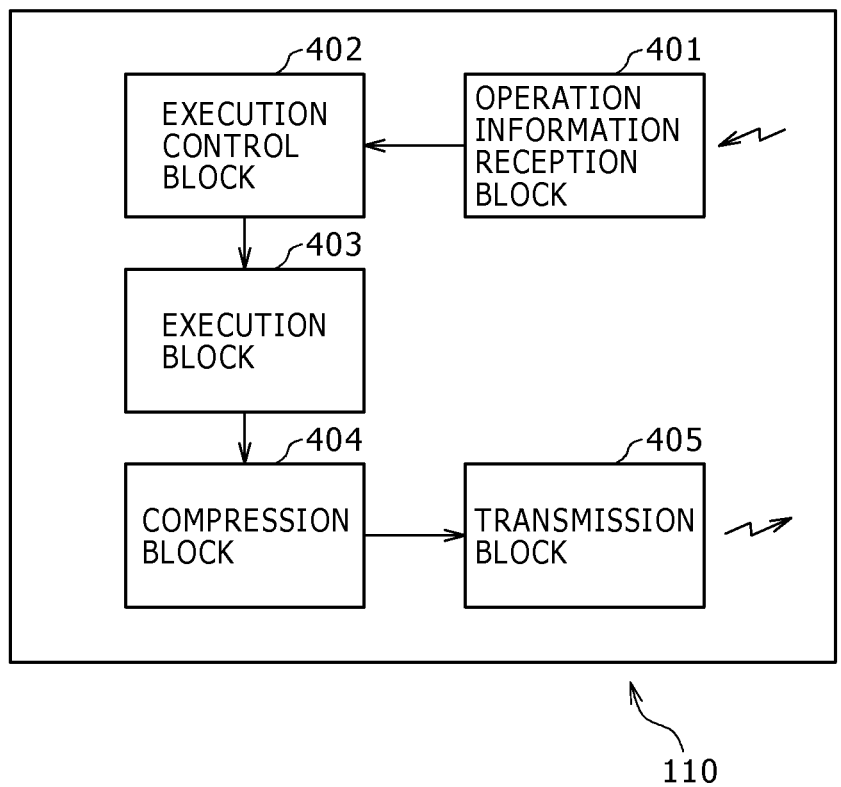
FIG. 4 is a diagram functionally illustrating a configuration of a server in the first embodiment.

Referring to FIG. 3, there is shown a diagram functionally describing a terminal configuration. Referring to FIG. 4, there is shown a diagram functionally describing a server configuration. As shown in FIG. 3, the terminal 120 functionally includes an operation information acquisition block 301, an operation information transmission block 302, a timer 303, an image information reception block 304, a decompression block 305, an image information generation block 306, and an image information output block 307. Further, as shown in FIG. 4, the server 110 includes an operation information reception block 401, an execution control block 402, an execution block 403, a compression block 404, and a transmission block 405.

First, the following describes a functional configuration of the terminal 120 in the processing executed between the acquisition of operation information by the terminal 120 and the transmission of the operation information to the server 110. As shown in FIG. 3, the operation information acquisition block 301 sequentially acquires the operation information entered in the operator block 125. To be more specific, the operation information acquisition block 301 detects and acquires the operation information at every predetermined interval (one frame interval for example) generated by the timer 303. The operation information transmission block 302 transmits the operation information acquired by the operation information acquisition block 301 to the server 110 through the network 130. It should be noted here that the terminal 110 and the server 120 are driven on the basis of a predetermined clock frequency for example; namely, the terminal 110 and the server 120 are not driven on the basis of a predetermined interval generated by the timer 303.

Figure 5:
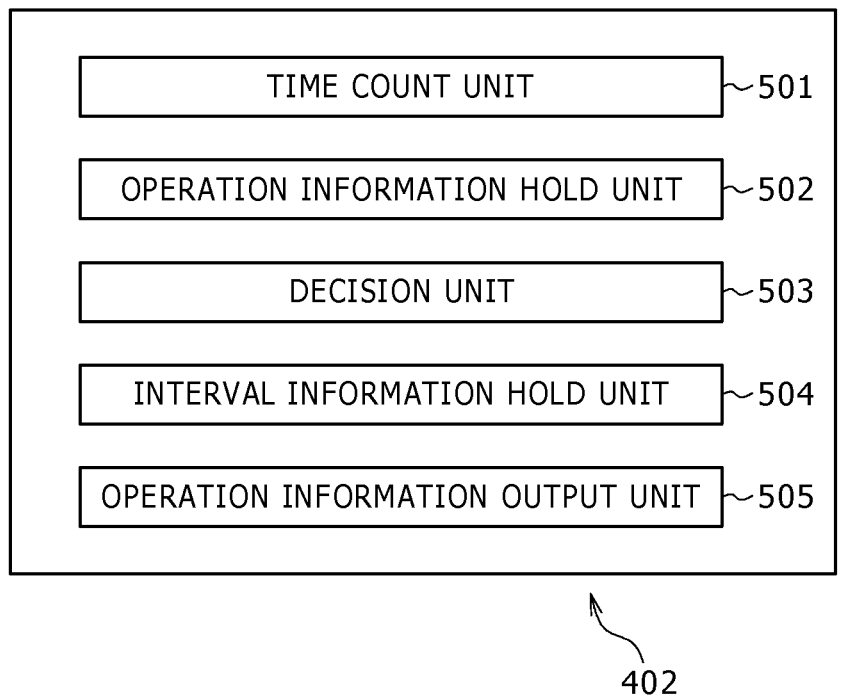
FIG. 5 is a diagram illustrating a functional configuration of an execution control block shown in FIG. 4.

Next, a functional configuration of the server 110 will be described. As shown in FIG. 4, the operation information reception block 401 of the server 110 sequentially receives operation information transmitted from the operation information transmission block 302 of the terminal 120 through the network 130. The execution control block 402 outputs each piece of operation information to the execution block 403 every time the operation information reception block 401 receives these pieces of operation information as will be described later. To be more specific, as shown in FIG. 5, the execution control block 402 includes a time count unit 501, an operation information hold unit 502, a decision unit 503, an interval information hold unit 504, and an operation information output unit 505. It should be noted that the functional configuration of the execution control block 402 shown in FIG. 5 is illustratively only and therefore not restrictive.

The interval information hold unit 504 holds information indicative of a first predetermined interval indicative of a first interval and information indicative of a second predetermined interval. To be more specific, the first predetermined interval is a predetermined interval shorter than one frame interval for example and the second predetermined interval is an interval longer than one frame interval and shorter than two frame intervals for example.

The time count unit 501 counts time from the point of time at which the operation information output unit 505 to be described later outputs operation information. Further, if a count time has reached the second predetermined interval with operation information not received from the point of time at which the operation information was outputted, the time count unit 501 notifies the operation information output unit 505 thereof. In this case, the time count unit 501 newly starts time counting. This count time is reset in response to a reset signal coming from the decision unit 503 to be described later and new time counting is started. It should be noted that the second predetermined interval described above is held in the interval information hold unit 504 as described above.

On the basis of a timing with which a piece of operation information is outputted and then a next piece of operation information is received, the decision unit 503 outputs this operation information. To be more specific, if it is decided that a certain piece of operation information has been outputted to the execution block 403 and then a next piece of operation information is received within the first predetermined interval, then the outputting of this next piece of operation information to the execution block 403 is skipped. Consequently, as will be described later, this decision prevents the occurrence of a situation in which two or more image display operations are executed within one frame interval for example to provide a so-called fast forward play.

Further, if it is decided that a next piece of operation information is received in the second predetermined interval after the passing of the first predetermined interval, then the decision unit 503 instructs the operation information output unit 505 to output this next piece of operation information. In this case, a reset signal for resetting a count time of the time count unit 501 is outputted and, in response to this reset signal, the time count unit 501 newly starts time counting. In addition, in this case, the decision unit 503 holds this outputted operation information into the operation information hold unit 502.

In response to a notification from the above-mentioned time count unit 501 or an output instruction from the decision unit 503, the operation information output unit 505 outputs the operation information received by the operation information reception block 401 or the operation information held in the operation information hold unit 502.

To be more specific, the following describes the processing of the execution control block 402 to be executed if the operation information reception block 401 sequentially receives first through third pieces of operation information, the first operation information being outputted from the operation information output unit 505 of the execution control block 402 to the execution block 403, by way of example. In this case, the operation information reception block 401 then receives the second piece of operation information. Because the first operation information has been outputted to the execution block 403, the first operation information has been held in the operation information hold unit 502 and the time count unit 501 has started time counting from the point of time at which the first operation information was outputted.

If the decision unit 503 decides that the second operation information was received within the first predetermined interval after the outputting of the first operation information to the execution block 403, then the outputting of the second operation information to the execution block 403 is skipped. At this moment, a configuration may be provided in which the second operation information is held in the operation information hold unit 502 in an overwrite manner and the first operation information held in the operation information hold unit 502 is discarded accordingly. If the decision unit 503 decides that the second operation information was acquired within the second predetermined interval after the passing of the first predetermined interval, then the second operation information is outputted from the operation information output unit 505 to the execution block 403. Also, in this case, the second operation information is held in the operation information hold unit 502. Further, at this moment, the time being counted by the time count unit 501 is reset and the time count unit 501 starts timing counting from the point of time at which the second operation information was outputted.

On the other hand, if the time count unit 501 the time count unit 501 counts the second predetermined interval with the next operation information (in the above-mentioned example, any one piece of operation information to be received after the first operation information, such as the second operation information or the third operation information) not received, the operation information output unit 505 outputs the first operation information held in the operation information hold unit 502 to the execution block 403 in response to the notification from the time count unit 501. In other words, in this case, the execution processing corresponding to the first operation information is executed again in the execution block 403. Then, the time count unit 501 resets the time counted so far and starts time counting from the outputting of the first operation information held in the operation information hold unit 502.

That is, in the example mentioned above, if operation information (the second operation information or the third operation information, for example) is received within the first predetermined interval, the execution control block 402 skips the outputting of this operation information to the execution block 403. Consequently, if two or more pieces of operation information are received within the first predetermined interval (an interval shorter than one frame interval for example), for example, the processing of only the operation information acquired first (the first operation information in the above-mentioned example) is executed, thereby preventing the execution block 403 from performing the executions corresponding to two or more pieces of operation information within a predetermined interval (within the first predetermined interval). In addition, in the example mentioned above, if the second operation information is acquired within the second predetermined interval after the passing of the first predetermined interval, then the second operation information is outputted to the execution block 403. Further, in the example mentioned above, if the second predetermined interval (an interval longer than the one frame interval) has passed with operation information not acquired after the outputting of the first operation information, then the first operation information is outputted to the execution block 403 again. Consequently, consequently, if next operation information is not acquired after the passing of a predetermined interval (the second predetermined interval), the execution can be performed by use of the preceding operation information.

The execution block 403 performs the execution processing of an application corresponding to the operation information outputted from the execution control block 402 to generate image information corresponding to this operation information. To be more specific, the execution block 403 is equivalent to an emulator or a simulator for a dedicated game machine, for example. Alternatively, the execution block 403 may be configured by incorporating a dedicated game machine itself. The compression block 404 sequentially compresses each piece of image information generated by the execution block 403 and the transmission block 405 transmits above-mentioned each piece of compressed image information to the terminal 120.

The following describes a functional configuration of the terminal 120 in which the processing from the reception of image information from the server 110 by the terminal 120 to the displaying of the received image information onto the display block 124 is realized. As shown in FIG. 3, the image information reception block 304 of the terminal 120 sequentially acquires each piece of image information transmitted from the transmission block 405 of the server 110 through the network 130. The decompression block 305 sequentially decompresses each piece of compressed image information acquired by the image information reception block 304 and the image information generation block 306 sequentially generates each piece of image information to be displayed on the display block 124 from each piece of decompressed image information.

The image information output block 307 sequentially outputs each piece of image information sequentially generated by the image information generation block 306 to the display block 124 and the display block 124 accordingly displays each piece of received image information. Here, the image information output block 307 outputs images in every predetermined interval (one frame interval for example) by the timer 303, so that a delay of approximately 0 to 16 msec may be caused in a period of time from the generation of image information by the image information generation block 306 to the outputting of an image onto the display block 124 by the image information output block 307.

Figure 6:
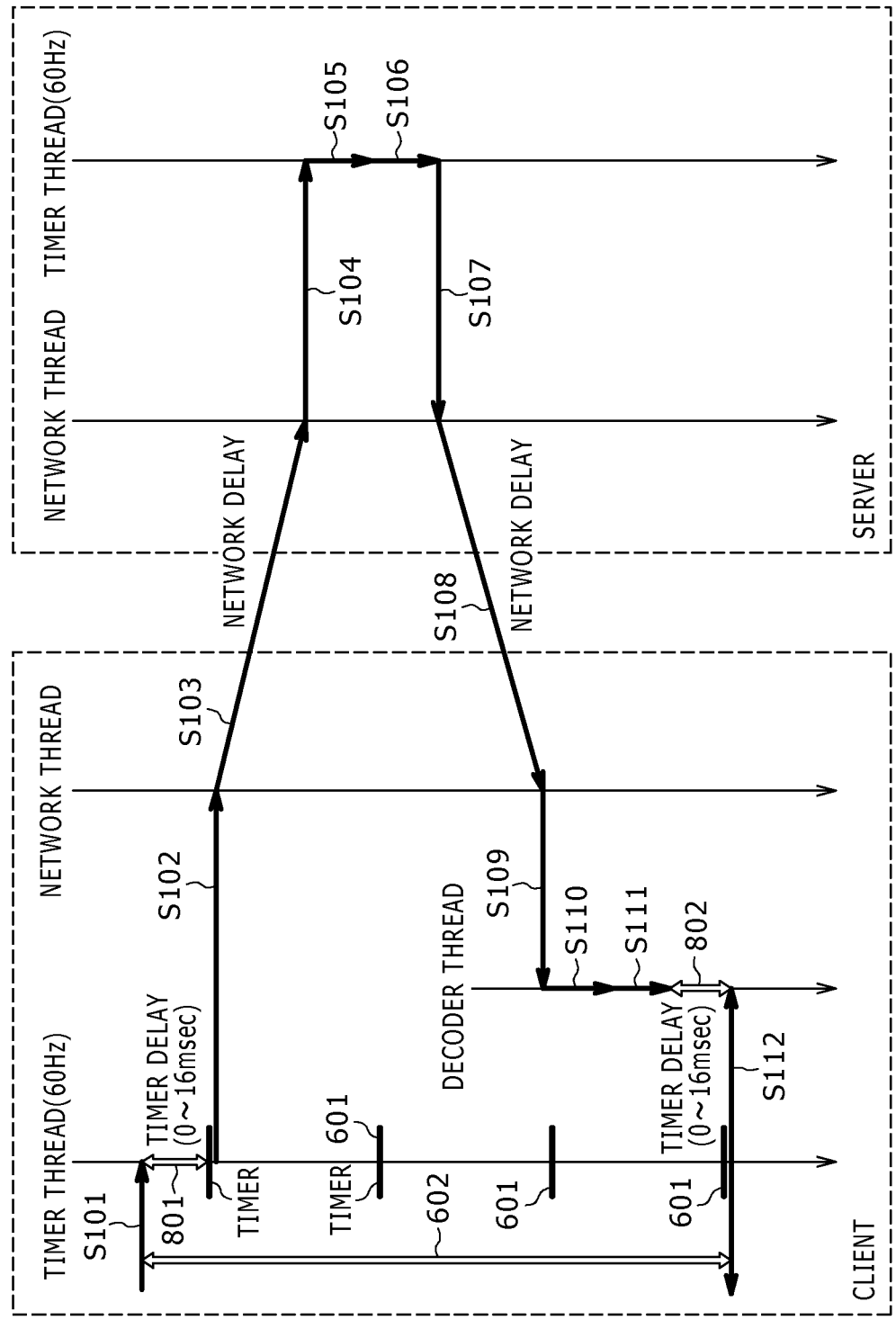
FIG. 6 is a diagram illustrating one example of a flow of processing in the first embodiment.

The following describes processing flows of the server 110 and the terminal 120 in the present embodiment. Referring to FIG. 6, there is shown a diagram illustrating processing flows of the server 110 and the terminal 120 in the present embodiment. As shown in FIG. 6, the blocks 301 through 307 and the blocks 401 through 405 of the terminal 120 and the server 120 are each realized by a Thread, for example. It should be noted that Timer Thread shown at the left side of FIG. 6 is indicative of an operation information acquisition timing and an image information output timing of the operation information acquisition block 301 and the image information output block 307 shown in FIG. 3. NetWork Thread is indicative of an operation information timing and an image information reception timing of the operation information transmission block 302 and the image information reception block 304. Decoder Thread is indicative of image information compression and generation timings of the compression block 305 and the image information generation block 306. Further, NetWork Thread shown in the right side of FIG. 6 is indicative of an operation information reception timing and an image information transmission timing of the operation information reception block 401 and the transmission block 405 and Main Thread is indicative of operation information execution processing timings of the execution control block 402, the execution block 403, and the compression block 404. It should be noted that, in the present embodiment, a configuration is used in which the processing is executed only for the Timer Thread of the terminal 120 on the basis of timer-generated timings as described above.

As shown in FIG. 6, first, operation information is entered in the operator block 125 of the terminal 120 (S101). The operation information acquisition block 301 detects and acquires the operation information with a timing of every predetermined interval (one frame interval for example) generated by the timer 303 and outputs this operation information to the operation information transmission block 302 (S102). Consequently, a delay of approximately 0 to 16 msec is caused by the timer 303 in a period of time from the actual inputting of operation information by the user to the acquisition of the operation information by the operation information acquisition block 301. When the operation information acquisition block 301 acquires the operation information, the operation information transmission block 302 transmits this operation information to the server 110 through the network 130 (S103).

The operation information reception block 401 of the server 110 acquires the operation information transmitted from the terminal 120 through the network 130 and outputs this control information to the execution block 403 through the execution control block 402 (S104). Here, because operation information is received and transmitted through the network 130, a network delay is caused in a period of time from the transmission of operation information by the operation information transmission block 302 of the terminal 120 to the reception of this operation information by the operation information reception block 401 of the server 110. It should be noted that, as described above, the execution control block 402 may sometimes not output operation information to the execution block 403 in accordance with a timing of the reception of the operation information; however, the example shown in FIG. 6 assumes that operation information received by the operation information reception block 401 be outputted to the execution block 403 through the execution control block 402 for the brevity of description.

The execution block 403 generates image information in accordance with the operation information outputted from the execution control block 402 (S105). At this moment, the execution block 403 is not driven by the timer 303 as described above, no delay due to the timer 303 is caused as compared with the case in which the execution block 403 acquires operation information with a timing generated by the timer 303. The compression block 404 compresses the image information generated by the execution block 403 (S106). The transmission block 405 acquires the image information compressed by the compression block 404 (S107) and transmits the compressed image information to the terminal 120 through the network 130 (S108). The image information reception block 304 of the terminal 120 acquires the compressed image information transmitted from the terminal 120 and outputs the compressed image information to the decompression block 305 (S109). Here, because this compressed image information is transmitted and received through the network 130 in the same manner as described above, a network delay is caused in a period of time from the transmission of this compressed image information by the operation information transmission block 302 of the terminal 120 to the reception of this compressed image information by the image information reception block 304 of the server 110.

The decompression block 305 acquires and decompresses the compressed image information acquired by the image information reception block 304 (S110) and the image information generation block 306 generates image information from the decompressed image information to be displayed on the display block 124 (S111). The display block 124 displays the image information generated by the image information generation block 306 in accordance with a timing generated by the timer 303 (S112). Here, because the display block 124 displays image information every predetermined interval generated by the timer 303, a delay of 0 to 16 msec is caused due to the timer 303 in a period time from the generation of the image information to the displaying of the image information onto the display block 124. It should be noted that a configuration may be provided in which image information is displayed on the display block 124 in accordance with a frame rate set to this image information, for example. Further, image information before being displayed is held in a buffer (not shown), for example.

The above-mentioned configuration allows the prevention of a delay due to the timer 303 as compared with the case in which Main Thread of the server 110 is driven by the timer 303, operation information is acquired with a timing generated by the timer 303, and the processing according to this operation information is executed. The following provides more specific description with comparison with FIG. 9. FIG. 9 is a diagram illustrating an example in which the acquisition of operation information at a terminal and program execution according to operation information at a server are both driven by a timer. To be more specific, FIG. 9 shows a flow in the case where Main Thread of the server 110 in the present embodiment is driven by the timer (refer to Timer Thread shown at the right side of FIG. 9) and, at the same time, Timer Thread of the terminal 120 is likewise driven by the timer (refer to Timer Thread shown at the left side of FIG. 9). In the present embodiment, Timer delays 801 and 803 and a network delay shown in FIG. 9 are also caused; however, according to the present embodiment, occurrence of a Timer delay (Timer delay 802 shown in FIG. 9) of the server 110 can be presented unlike the case shown in FIG. 9. In addition, even if a network jitter and a packet loss are caused, thereby failing the reception of operation information by the server 110 every predetermined interval, image display can be updated in a certain range, thereby suppressing the influence onto gaming. That is, the response characteristic in a period of time from the inputting of operation information into the terminal 120 by the user to the reflection of this operation information onto a play image can be enhanced.

The present invention is not restricted to the embodiment described above; namely, the embodiment shown above may be replaced by any configurations that have substantially the same configuration as the configuration shown in the embodiment described above, provide the same effects as those of the embodiment described above, or achieve the same objective as that of the embodiment described above. To be more specific, in the description shown above, for example, the configuration was described in which the execution control block 402 uses the first predetermined interval and the second predetermined interval so as to prevent fast forward play or the like that may occur if the acquisition of operation information is not executed in accordance with constant intervals; however, it is also practicable to provide a configuration in which the number of times the processing according to each piece of operation information is executed within a certain period of time may be restricted. To be more specific, five times within 50 msec or 60 times within 1 sec, for example. Further, this number of times may be arranged in plurality with different intervals. It should be noted that, in this case, a number restriction unit for restricting the above-mentioned number of times is arranged in the execution control block 402, for example.

Further, the operation information transmission block 302 may be configured such that, only when operation information acquired by the operation information acquisition block 301 of the terminal 120 has changed, this changed operation information is transmitted to the server 110. To be more specific, if the operator block 125 of the terminal 120 has a button, for example, a configuration may be provided such that, only when the pressed button has been released or the released button has been pressed, the changed operation information is transmitted to the server 110. Alternatively, if the operator block 125 of the terminal 120 has an analog operator part, for example, a configuration may be provided such that, only if the analog control part has been operated further than a predetermined range from a reference state (in the case of an analog operator part of press-button type, if the analog control part is pressed further than a certain depth or, in the case of an analog operator part of tilt operation type, if the analog control part is operated in tilt manner further than a certain angle from a reference position, for example), the amount of that change is transmitted. In other words, a configuration may be provided in which, if a reference position (or an operation equivalent to a reference position) continues, once reference position operation information has been transmitted, no operation information is transmitted to the server 110 until a change occurs further than a predetermined range from the reference position. That is, in this case, operation information is acquired every predetermined interval generated by the timer 303; however, if the same operation information is acquired with a next timing, then the operation information transmission block 302 does not transmit this operation information. In addition, in this case, a configuration may be provided such that, in order to enhance packet loss resistance in the network 130, operation information is held before being transmitted plural times in accordance with one timing by the timer 303.

[Second Embodiment]

Figure 7:
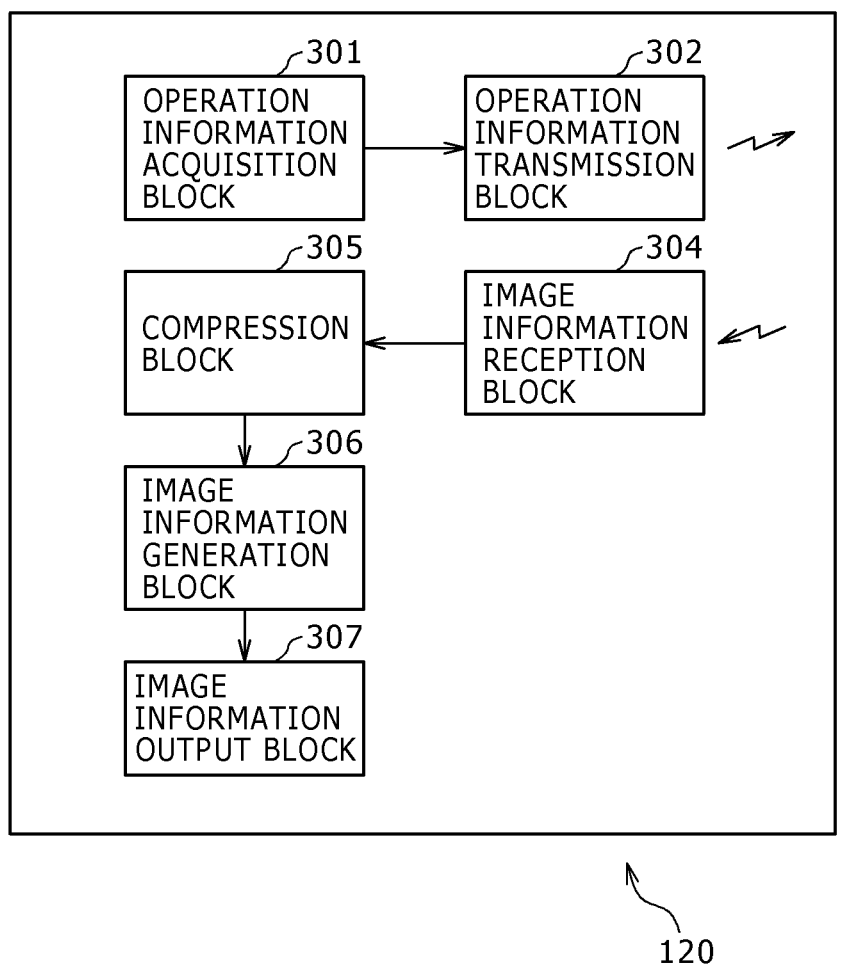
FIG. 7 is a diagram illustrating a functional configuration of a terminal in a second embodiment of the present invention.

Now, referring to FIG. 7, there is shown a diagram illustrating a functional configuration of a terminal 120 in the second embodiment of the present invention. As described above, in the first embodiment, the acquisition of operation information and the displaying of image information at the terminal 120 are executed in accordance with timings generated by the timer 303. By contrast, the present embodiment mainly differs from the first embodiment in configuration that the terminal 120 does not have a timer 303, operation information is transmitted to a server 110 in accordance with timings with which the operation information is detected and acquired, and image information is displayed in accordance with a timing with which the image information is generated. It should be noted that, in what follows, the description of matters common to those of the first embodiment will be skipped.

As shown in FIG. 7, the terminal 120 in the present embodiment functionally includes an operation information acquisition block 301, an operation information transmission block 302, an image information reception block 304, a decompression block 305, an image information generation block 306, and an image information output block 307. However, as described above, unlike the first embodiment, the terminal 120 of the present embodiment does not have a timer 303. It should be noted that, because the functional configuration of the server 110 is substantially the same as that of the first embodiment described above, the description of the functional configuration of the server 110 will be skipped.

The operation information acquisition block 301 of the terminal 120 sequentially acquires operation information entered in an operator block 125. Here, in the present embodiment, the operation information acquisition block 301 does not acquire operation information in accordance with a timing by the timer 313 as described above, but acquires operation information in accordance with the inputting thereof. To be more specific, a configuration may be provided in which an edge detection unit (not shown) for detecting the edge of a signal occurring when operation information is entered is arranged in the operation information acquisition block 301 for example, thereby detecting the edge of this signal. In this case, a signal can be detected faster, getting operation information. Consequently, unlike the first embodiment, the occurrence of a delay of approximately 0 to 16 msec, from the actual inputting of operation information to the acquisition of the operation information by the operation information acquisition block 301 can be suppressed.

Further, the operation information transmission block 302 transmits the operation information acquired by the operation information acquisition block 301 to the server 110 through a network 130. The image information reception block 304 sequentially acquires each piece of image information transmitted from the transmission block 405 of the server 110 through the network 130. The decompression block 305 sequentially decompresses each piece of compressed image information acquired by the image information reception block 304 and the image information generation block 306 sequentially generates each piece of image information from each piece of decompressed image information and displays each piece of generated image information on a display block 124.

The image information output block 307 sequentially outputs each piece of image information sequentially generated by the image information generation block 306 to the display block 124 and the display block 124 accordingly sequentially displays each piece of image information. Here, in the present embodiment, the image information output block 307 does not output image information in accordance with a timing by the timer 313 but outputs image information in accordance with a timing with which the image information was generated. Therefore, unlike the first embodiment, the occurrence of a delay of approximately 0 to 16 msec until an image is outputted by the image information output block 307 to the display block 124 can be suppressed.

Figure 8:
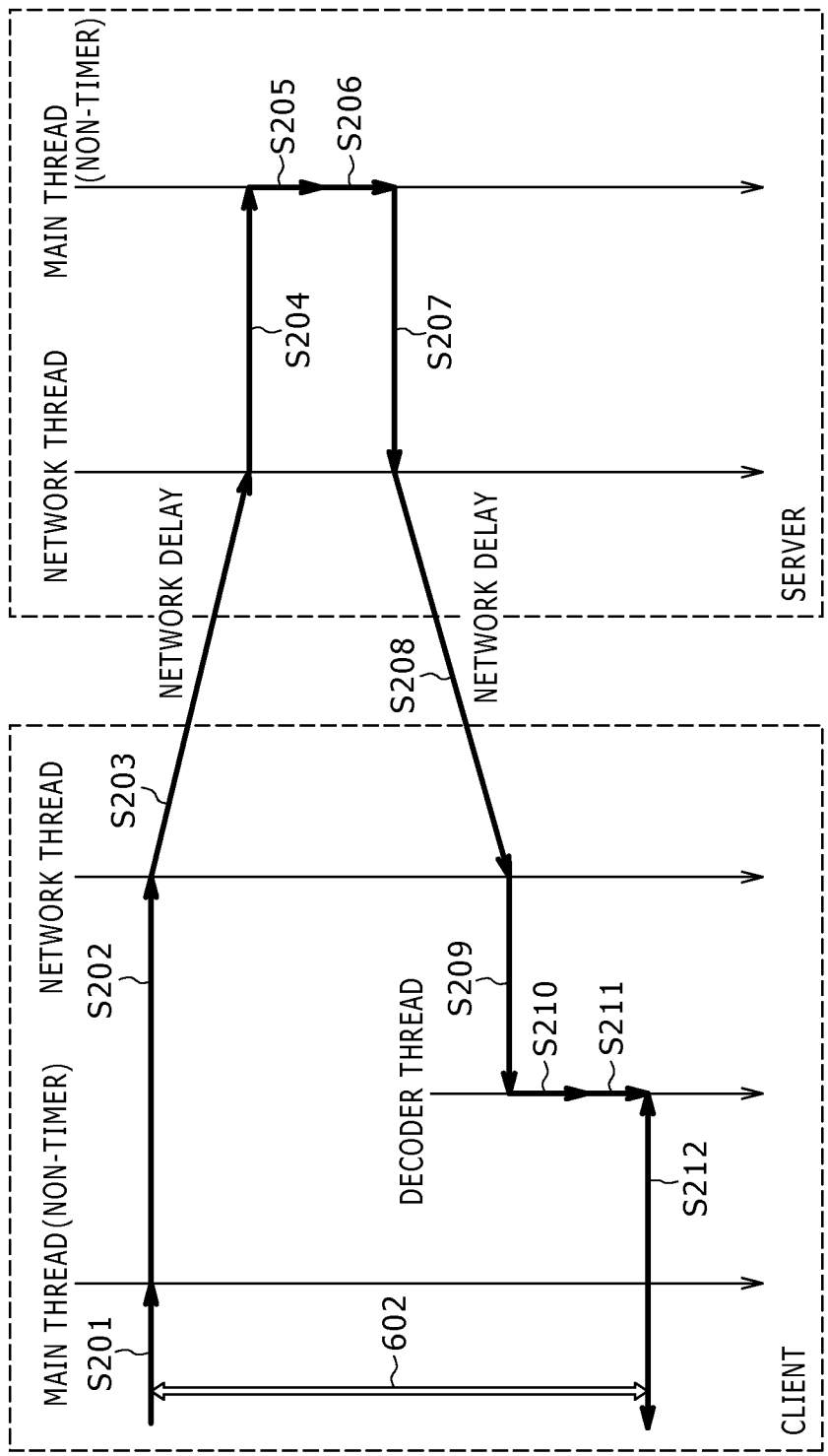
FIG. 8 is a diagram illustrating one example of a flow of processing in the second embodiment.

The following describes processing flows of the server 110 and the terminal 120 in the present embodiment. Referring to FIG. 8, there is shown a diagram illustrating processing flows of the server 110 and the terminal 120 in the present embodiment. As shown in FIG. 8, the blocks 301 through 307 and the blocks 401 through 405 of the terminal 120 and the server 120 are each realized by so-called Thread, for example. Here, Main Thread shown at the left side of FIG. 8 is indicative of timings of the acquisition of operation information and the outputting of image information of the operation information acquisition block 301 and the image information output block 307 shown in FIG. 7. NetWork Thread is indicative of an operation information timing and an image information reception timing of the operation information transmission block 302 and the image information reception block 304. Decoder Thread is indicative of image information compression and generation timings of the compression block 305 and the image information generation block 306. NetWork Thread shown at the right side of FIG. 8 is indicative of timings of operation information reception and image information transmission of the operation information reception block 401 and the transmission block 405 and Main Thread is indicative of operation information execution processing timings and so on of the execution control block 402, the execution block 403, and the compression block 404. It should be noted that, unlike the first embodiment, the present embodiment does not have a configuration in which Main Thread of the server 110 and the terminal 120 executes processing in accordance with a timing generated by a timer.

As shown in FIG. 8, first, the user enters operation information (S201). In response to this operation information, the operation information acquisition block 301 detects and acquires the operation information and outputs this operation information to the operation information transmission block 302 (S202). Therefore, unlike the first embodiment, the occurrence of a delay of approximately 0 to 16 msec due to the timer 303, for example, until the operation information acquisition block 301 acquires operation information can be suppressed. When the operation information acquisition block 301 gets operation information, the operation information transmission block 302 transmits this operation information to the server 110 through the network 130 (S203).

The operation information reception block 401 of the server 110 acquires operation information transmitted from the terminal 120 through the network 130 and outputs this operation information to the execution block 403 through the execution control block 402 (S204). Here, because operation information is received and transmitted through the network 130, a network 130 delay occurs in a period of time from the actual transmission of operation information by the operation information transmission block 302 of the terminal 120 to the reception of this operation information by the operation information reception block 401 of the server 110. It should be noted that the execution control block 402 may not output operation information in accordance with a timing with which operation information was received as described above; however, FIG. 8 shows the case in which operation information received by the operation information reception block 401 is outputted to the execution block 403 through the execution control block 402 for the brevity of description.

The execution block 403 generates image information in accordance with the operation information outputted by the execution control block 402 (S205). At this moment, because the execution block 403 is not driven by the timer 303, no delay due to the timer 303 occurs unlike the case in which the execution block 403 acquires operation information with a timing by the timer 303. The compression block 404 compresses the image information generated by the execution block 403 (S206). The transmission block 405 acquires the image information compressed by the compression block 404 (S207) and transmits the compressed image information to the terminal 120 through the network 130 (S208).

The image information reception block 304 of the terminal 120 acquires the compressed image information transmitted from the terminal 120 (S209). Here, because this compressed image information is received and transmitted through the network 130 in substantially the same manner as above, a network delay occurs in a period of time from the actual transmission of this compressed image information by the operation information transmission block 302 of the terminal 120 to the reception of this compressed image information by the image information reception block 304 of the server 110. The decompression block 305 acquires and decompresses the compressed image information acquired by the image information reception block 304 (S210). The image information generation block 306 generates image information to be displayed on the display block 124 from the decompressed image information (S211). In accordance with the generation of image information by the image information generation block 306, the display block 124 displays this image information (S114). Here, because the display block 124 executes display not in accordance with a timing by the timer 303 but in accordance with the generation of image information by the image information generation block 306, the occurrence of a delay of approximately 0 to 16 msec due to the timer 303 as with the first embodiment can be prevented. To be more specific, for example, the display block 124 updates a frame buffer (not shown) arranged in the display block 124 without waiting for a vertical synchronization signal (VSYNC).

The configuration described above can prevent a delay due to a timer unlike the case in which Main Thread of the server 110 and the terminal 120 is driven by a timer (refer to FIG. 9). In the present embodiment, not only the occurrence of a timer delay (Timer delay 802 shown in FIG. 9) of the server 110 can be prevented as with the first embodiment, but also the occurrence of timer delays (Timer delays 801 and 803 shown in FIG. 9) in the terminal 120 can be prevented unlike the first embodiment. Further, if operation information cannot be received by the server 110 every certain interval due to network jitter or packet loss, image display can be updated within a certain range, thereby suppressing the influence on gaming. Still further, in the present embodiment, operation information may be transmitted from the terminal 120 in an irregular manner; in this case, the updating of image display can also be executed within a certain range, thereby suppressing the influence on gaming. In other words, the response characteristic in a period of time from the inputting of operation information into the terminal 120 by the user to the reflection of this operation information onto a play image can be enhanced.

The present invention is not restricted to the first embodiment or the second embodiment, variations thereof being practicable. For example, the configuration of the first or second embodiment may be replaced by any configuration that is substantially the same as the configuration of the first or second embodiment, provides substantially the same effects as those of the first or second embodiment, or achieves substantially the same objective as that of the first or second embodiment. To be more specific, in the configurations described above, for example, the execution control block 402 uses the first predetermined interval and the second predetermined interval to prevent fast forward play or the like that may occur if the acquisition of operation information is not executed in constant intervals; it is also practicable to restrict the number of times the processing is executed in accordance with each piece of operation information within a certain period of time. To be more specific, five times within 50 msec or 60 times within 1 sec, for example. Further, this number of times may be provided in plurality by changing intervals. Still further, in the above, the case in which a so-called client-server system is used was described. However, the present invention is not limited to this; it is also practicable to realize the present invention by use of a so-called cloud based on a virtual server. Yet further, the first embodiment and the second embodiment described above may be combined to provide a configuration in which the terminal 120 acquires operation information every predetermined timing by the timer 303 to transmit the operation information to the server 110 and operation information is transmitted to the server 110 with a timing of detecting and acquiring the operation information. It should be noted that the first and second predetermined intervals in the claims are equivalent to the above-mentioned second and first predetermined intervals, respectively, for example.

The invention claimed is:

1. A server comprising:
    an operation information acquisition circuit operating to sequentially acquire each piece of operation information, including respective first operation information and respective second operation information, sequentially transmitted from a terminal through a network;
    an execution circuit operating to execute an application by executing processing corresponding to the respective first and second operation information in accordance with a timing with which the operation information acquisition circuit acquired the respective first and second operation information;
    a timer circuit operating to measure respective first predetermined intervals and respective second predetermined intervals, where: (i) respective starts of the respective first predetermined intervals are from respective points in time that the respective first operation information are received, and where respective ends of the respective first predetermined intervals are a predetermined fixed first amount of time later than the respective starts, and (ii) respective starts of the respective second predetermined intervals are from respective points in time that the respective first operation information are received, and where respective ends of the respective second predetermined intervals are a predetermined fixed second amount of time later than the respective starts, and where the predetermined fixed second amount of time is shorter than the predetermined fixed first amount of time;
    an execution control circuit operating, if one of the first predetermined intervals has passed from when the execution circuit started processing a corresponding one of the respective first operation information without acquiring any second operation information acquired after the one of the respective first operation information and within such one of the first predetermined intervals, to make the execution circuit execute processing in accordance with the one of the respective first operation information again; and
    a transmission circuit operating to transmit image information based on the execution of the application by the execution block to the terminal.

2. The server according to claim 1, wherein, if one of the second operation information is acquired within a corresponding one of the second predetermined intervals, starting from a corresponding one of the points in time that the corresponding one of the respective first operation information was received, then the execution control circuit skips execution of the one of the second operation information by the execution circuit.

3. The server according to claim 1, wherein each piece of operation information sequentially transmitted from the terminal is sequentially detected by the terminal with every predetermined timing generated by a timer and sequentially transmitted to the server through the network.

4. The server according to claim 1, wherein each piece of operation information sequentially transmitted from the terminal is transmitted to the server through the network with a timing corresponding to detection of the each piece of operation information at the terminal.

5. The server according to claim 2, wherein the execution control circuit restricts a total number of times that any of the first and second operation information is processed in the execution block within a third predetermined interval different from the first and second predetermined intervals.

6. A terminal comprising:
an operation information acquisition circuit operating to acquire each piece of operation information, including respective first operation information and respective second operation information, sequentially entered in an operator block;
an operation information transmission circuit operating to sequentially transmit operation information sequentially acquired by the operation information acquisition circuit to a server through a network;
an image information reception circuit operating to receive each piece of image information transmitted from transmission circuit of the server, the server having:
an operation information acquisition circuit operating to sequentially acquire each piece of operation information sequentially transmitted from the operation information transmission circuit,
an execution circuit operating to execute an application by executing processing corresponding to the respective first and second operation information in accordance with a timing with which the operation information acquisition circuit acquired the respective first and second operation information,
a timer circuit operating to measure respective first predetermined intervals and respective second predetermined intervals, where respective starts of the respective first predetermined intervals are from respective points in time that the respective first operation information are received, and where respective ends of the respective first predetermined intervals are a predetermined fixed first amount of time later than the respective starts,
an execution control circuit operating, if one of the first predetermined intervals has passed from when the execution circuit started processing a corresponding one of the respective first operation information without acquiring any second operation information, defined as an absence of second operation information, acquired after the one of the respective first operation information, to make the execution circuit execute processing in accordance with the one of the respective first operation information again, and
a transmission circuit operating to transmit image information based on the execution of the application by the execution circuit to the terminal; and
a display circuit operating to display each piece of image information received by the image information reception circuit.

7. The terminal according to claim 6, wherein the operation information acquisition circuit detects and acquires operation information entered in the operator block in accordance with every predetermined timing generated by the timer circuit.

8. The terminal according to claim 6, wherein the operation information acquisition circuit detects and acquires the each piece of operation information entered in the operator block in accordance with a timing with which the each piece of operation information was entered in the operator block.

9. The terminal according to claim 8, wherein the operation information acquisition circuit detects and acquires the each piece of operation information entered in the operator block by detecting an edge of the each piece of operation information.

10. The terminal according to claim 7, wherein the display circuit displays each piece of image information received by the image information reception circuit in every interval generated by the timer circuit.

11. The terminal according to claim 8, wherein the display circuit displays the each piece of image information in accordance with a timing with which the each piece of image information was received by the image information reception circuit.

12. An information processing method comprising:
sequentially acquiring each piece of operation information, including respective first operation information and respective second operation information, sequentially transmitted from a terminal through a network;
executing, by an execution circuit, an application by executing processing corresponding to the respective first and second operation information in accordance with a timing with which the respective first and second operation information was acquired;
measuring timing of respective first predetermined intervals and respective second predetermined intervals, where: (i) respective starts of the respective first predetermined intervals are from respective points in time that the respective first operation information are received, and where respective ends of the respective first predetermined intervals are a predetermined fixed first amount of time later than the respective starts, and (ii) respective starts of the respective second predetermined intervals are from respective points in time that the respective first operation information are received, and where respective ends of the respective second predetermined intervals are a predetermined fixed second amount of time later than the respective starts, and where the predetermined fixed second amount of time is shorter than the predetermined fixed first amount of time;
making, if one of the first predetermined intervals has passed from when the execution circuit started processing a corresponding one of the respective first operation information without acquiring any second operation information acquired after the one of the respective first operation information and within such one of the first predetermined intervals, the execution circuit execute processing in accordance with the one of the respective first operation information again; and
transmitting image information based on the execution of the application by the execution block to the terminal.

13. A non-transitory, computer-readable recording medium containing an information processing program, which when executed by a computer, causes the computer to carry out actions, comprising:
sequentially acquiring each piece of operation information, including respective first operation information and respective second operation information, sequentially transmitted from a terminal through a network;
executing, by an execution circuit, an application by executing processing corresponding to the respective first and second operation information in accordance with a timing with which the respective first and second operation information was acquired;
measuring timing of respective first predetermined intervals and respective second predetermined intervals, where: (i) respective starts of the respective first predetermined intervals are from respective points in time that the respective first operation information are received, and where respective ends of the respective first predetermined intervals are a predetermined fixed first amount of time later than the respective starts, and
(ii) respective starts of the respective second predetermined intervals are from respective points in time that the respective first operation information are received, and where respective ends of the respective second predetermined intervals are a predetermined fixed second amount of time later than the respective starts, and where the predetermined fixed second amount of time is shorter than the predetermined fixed first amount of time;

making, if one of the first predetermined intervals has passed from when the execution circuit started processing a corresponding one of the respective first operation information without acquiring any second operation information acquired after the one of the respective first operation information and within such one of the first predetermined intervals, the execution circuit execute processing in accordance with the one of the respective first operation information again; and transmitting image information based on the execution of the application by the execution block to the terminal.

\* \* \* \* \*